United States Patent Office 3,580,944
Patented May 25, 1971

3,580,944
UNSATURATED ALKYL SULFAMATES AND METHOD OF PREPARATION
Robert W. Hill, Leawood, Kans., assignor to Gulf Research & Development Company, Pittsburgh, Pa.
No Drawing. Filed Aug. 28, 1967, Ser. No. 663,568
Int. Cl. C07c *143/68;* C08f *45/46*
U.S. Cl. 260—456
4 Claims

ABSTRACT OF THE DISCLOSURE

Alkenyl sulfamates having 10 to 22 carbon atoms, such as erucyl sulfamate and oleyl sulfamate, are prepared by refluxing the correspond alkenol with sulfamide in a suitable solvent, such as dioxane, until evolution of ammonia ceases. These alkenyl sulfamates are useful as slip additives in mono-olefin polymers, such as polyethylene or polypropylene, when added in amounts from 0.005 to 1 percent by weight.

BACKGROUND OF THE INVENTION

It is desired in many articles fabricated of polyolefins to have good "slip" proper ties. "Slip," as is known to the plastic film trade, relates to the resistance of the film when a surface of the film slides over an adjoining surface of the same film. By good "slip" is meant the property of polyolefins, such as polyethylene objects, for example, to slip or to slide one over the surface of another with a minimum of pulling force. Poor "slip" characteristics of polyethylene film are especially troublesome to users of automatic packaging equipment.

Polyolefin objects, for example, polyethylene films, tubes, and other objects have a tendency to adhere strongly to each other when in contact, as in a roll of film or in a stack of bags fabricated from untreated polyethylene. This adherence referred to in the art as "blocking" is obviously inconvenient and troublesome, particularly when polyethylene bags, films, and the like are fed in sequence from a stack into automatic packing and filling mechanisms. Moreover, the tendency of polyolefins to block is magnified by applied pressure and by elevated temperatures.

In the manufacture of olefin polymer films such as polyethylene and polypropylene film, it is customary to incorporate into the polymer a material which blooms to the surface of the film and functions as a lubricant. Such materials are referred to in the art as slip agents or slip additives. Although a wide variety of materials have been proposed for use as slip agents in olefin polymers, only two compounds are widely used for this purpose, oleamide and ercuamide. Olefin polymer compositions containing oleamide and/or erucamide as slip additives are subject to a number of known shortcomings. First, film manufactured from such compositions frequently has an undesirable odor. Second, these slip agents frequently exude from the polymer at an extremely rapid rate and/or are volatilized from the polymer, are deposited on surfaces which come in contact with the film, and are lost from the film, thus becoming ineffective.

SUMMARY OF THE INVENTION

This invention relates to novel sulfamates, methods for preparing them, and olefin polymer compositions containing them. The novel sulfamates are alkenyl sulfamates having the structure $ROSO_2NH_2$ where R is alkenyl having from 10 to 22 carbon atoms. These sulfamates are prepared by refluxing the alkenol having 10 to 22 carbon atoms with sulfamide in a suitable solvent until evolution of ammonia ceases. In amounts of about 0.005 to 1 percent these sulfamides are effective slip additives for polyolefin films.

Films, tubes, plates and the like are provided from the above compositions by employing devices and processes customarily employed in the preparation of such articles from olefin polymers. To illustrate, film can be provided with the inventive compositions by using film extruders, blown film machines and the like.

DESCRIPTION OF PREFERRED EMBODIMENT

A solution of 168.5 g. (0.552 mole) of erucyl alcohol, 50.0 g. (0.52 mole) of sulfamide and 300 ml. of p-dioxane was heated under reflux for 18 hrs. and then was cooled and filtered to yield 25.0 g. of white solid. Recrystallization of this material with acetone gave 17.2 g. of material, M.P. 85–92° C. Evaporation of the dioxane filtrate and crystallization of the residue from hexane gave an additional 68.0 g. of material, M.P. 50–78° C. The infrared spectra of both fractions were the same, having characteristic absorption bands at 3340 and 3270 cm.$^{-1}$ $$(-SO_2-)$$

A thin layer chromatogram showed the absence of erucyl alcohol. The broad melting point of the material is due due to the presence of other sulfamates, notably the oleyl and arachiodonyl sulfamates whose precursor alcohols were present in the commercial grade erucyl alcohol employed. This method was used to prepare oleyl sulfamate having a melting point of 67–85° C. Also, this method is useful to prepare other alkenyl sulfamates from other alkenols.

In evaluating the blocking characteristics of the polyolefin compositions of this invention containing alkenyl sulfates, film is prepared by standard procedures and is evaluated following a plate test method conducted as follows: The film to be tested is conditioned at least 16 hours at 73° F., 50 percent relative humidity. About 5½" x 4½" sections of unseparated blown film are carefully severed from a roll without stretching or otherwise distorting and leaving the block of the internal surfaces of the tube intact. The unseparated film specimen is placed between two 4-inch square metal plates with approximately ½" of film protruding from each end of the plate. Both plates are brought into contact with the film in line with each other. The edges of the film are carefully separated and the top film affixed by tape to the top plate and the bottom film layer to the bottom plate in a like manner. The blocking measure is the load in grams required to separate the film sections. The lower the value, the better the resistance of the test specimen to blocking.

The slip evaluations are determined by the following standard procedure: The apparatus employed is a moving platform—stationary sled type—in which the sled and the platform are in level horizontal planes and the sled is superimposed on the platform. The sled consists of a rectangular metal block having surface dimensions of 2½" x 2½", the sled being ¼" thick with a square piece of ⅛" thick medium density foam rubber, 1.414" x 1.414" centered on the sled's bottom surface; a 1.414" x 1.414" piece of 3-M-ite 320 grit aluminum oxide cloth is fastened to the outside surface of the foam rubber by double-faced tape. The sled is weighted to 200±2 grams. The specimens to be tested are conditioned for at least 16 hours at 73° F., 50 percent relative humidity. To the platform having dimensions of approximately 8" x 24" is affixed by taping a section of blown film with the inside tube surface exposed, with the axis of the machine direction of the film coinciding with the longitudinal axis of the sled. A 4½" square section of film is attached to the sled in like manner leaving the respective inside surfaces of the film sections in gravity contact when in testing position. The platform is moved in the horizontal plane in the machine direction of the films to provide a slipping action of the film of the stationary sled over the film of the moving platform, at a rate of about 0.5±0.1 feet per minute. A strain gauge coupled to the driving mechanism measures the frictional force from between 2 and 5 inches of the run while the surfaces are sliding uniformly over one another. The kinetic coefficient of friction is calculated as follows:

$$Slip = A/B$$

where A is the average reading obtained between 2 and 5 inches of travel of the film surfaces in grams, and B equals the sled weight in grams.

The erucyl sulfamate prepared above was incorporated into polyethylene by customary blending with a Banbury mixer, then extruded into film with conventional blown-film equipment, and tested for slip coefficient and block. At a concentration of 0.05 percent the slip coefficient was found to be .29 and the block was found to be 7.0 grams. At 0.075 percent the slip coefficient was found to be 0.19. The control polyethylene film, with no slip additive, had a slip coefficient value of 1.28 and a block value of 12.8 grams. No odor was apparent from the film, nor was there any excessive amount of erucyl sulfamate additive present on the surface of the film.

I claim:
1. An alkenyl sulfamate having the structure

$$ROSO_2NH_2$$

where R is alkenyl having 10 to 22 carbon atoms.
2. Erucyl sulfamate.
3. Oleyl sulfamate.
4. The method of preparing an alkenyl sulfamate comprising refluxing an alkenol having 10 to 22 carbon atoms with sulfamide in dioxane until evolution of ammonia ceases.

References Cited
UNITED STATES PATENTS 2,839,562  6/1958  Wegler et al. _____ 260—456

LEON ZITVER, Primary Examiner

L. DE CRESCENTE, Assistant Examiner

U.S. Cl. X.R.

260—30.8